INVENTOR.
WILLIAM SHOCKLEY
BY
Flehr and Swain
ATTORNEYS

SURFACE CONTROLLED AVALANCHE TRANSISTOR

Filed June 11, 1964

INVENTOR.
WILLIAM SHOCKLEY
BY
Flehr and Swain
ATTORNEYS

United States Patent Office 3,339,086
Patented Aug. 29, 1967

3,339,086
SURFACE CONTROLLED AVALANCHE TRANSISTOR

William Shockley, Los Altos, Calif., assignor, by mesne assignments, to International Telephone and Telegraph Corporation, New York, N.Y., a corporation of Maryland Filed June 11, 1964, Ser. No. 374,501
5 Claims. (Cl. 307—88.5)

This invention relates generally to a transistor and more particularly to an avalanche transistor.

It is a general object of the present invention to provide a transistor in which the avalanche generation of carriers is controlled by a control electrode.

It is another object of the present invention to provide a transistor in which controlled avalanche generated carriers flow through the principal voltage drop of the device at high electric fields.

It is a further object of the present invention to provide a transistor which is capable of operating at relatively high frequencies because of short transit time of controlled carriers.

It is still a further object of the present invention to provide a high frequency, high power transistor structure which is relatively insensitive to temperature.

It is a further object of the present invention to provide a transistor in which avalanche generated carriers are controlled by a control terminal which does not draw current.

These and other objects of the invention will become more clearly apparent from the following description when taken in conjunction with the accompanying drawing.

Referring to the drawings.

Briefly, the transistor of the present invention operates by controlling the generation of avalanche carriers with a control terminal which does not draw appreciable current. The avalanche generated carriers, in turn, flow through the principal voltage drop of the device and through the load.

Figure 1:
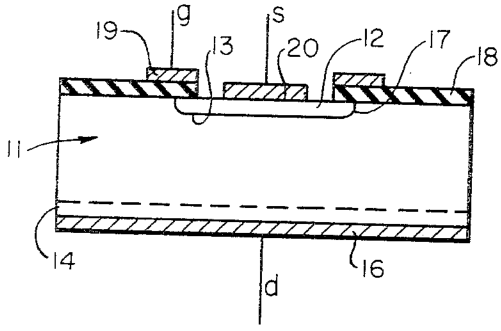
FIGURE 1 is a sectional elevational view of a transistor in accordance with the invention.

Referring particularly to FIGURE 1, the device shown is of so-called planar configuration. It includes a body portion 11 having impurities characterizing one conductivity type. An inset region having impurities characterizing an opposite conductivity type forms a rectifying junction 13 with the region 11. For example, the region 12 may have a relatively high concentration of donor atoms to form an n+ type semiconductor region, while the region 11 may have a concentration of acceptor atoms to define a p-type semiconductor region. A high impurity concentration of acceptor atoms defines a p+ type transition region 14 for the ohmic connection 16. Ohmic connection 20 is made to the region 12. Overlying the device and covering the portion of the junction 13 extending to the surface, portion 17, is an insulating layer 18. This layer may be a thermally or otherwise formed oxide of the semiconductive material forming the device. A control electrode is disposed on the insulating layer adjacent the junction portion 17. This electrode, as well as the others described above, may be formed by evaporation or other process well known in the art.

The various regions may be defined in terms of the roles they play in the operation of the device. Since these roles are quite similar to those in a field effect transistor, similar terminology is used herein. The region 12 is a source of carriers; the region 11 and high conductivity region 14 form the drain for the carriers; and the electrode 19 forms the control or gate electrode. The symbols *s*, *d* and *g* stand for the source, drain and gate electrodes, respectively.

In operation, the device is connected so that there is avalanche breakdown voltage at a portion of the p-n junction between the source and drain. As is well known, this type of breakdown is caused by accelerating carriers with relatively high fields so that they gain sufficient energy to ionize atoms and form additional carriers which may, in turn, enter into the process to give carrier multiplication. In general, in devices of this type, the breakdown will occur initially at the portion 17 of the junction which lies near the surface. This is due to conditions which cause the field to be higher near the surface at this portion of the junction.

Assuming, for example, that the gate electrode were not present, then the application of a relatively high reverse voltage between source and drain would cause avalanche breakdown, the avalanche current would be stabilized at some value for a given voltage applied between the source and drain. In general, two terminal devices of this type are used in pulse circuits or in voltage regulating circuits.

In accordance with the invention, it has been found that by independently controlling the electric field at the junction 13, it is possible to control avalanche current flowing to the drain. The control or gate electrode provides a means for introducing an additional and independent electric field at the avalanche-breakdown source point of (asp) p-n junction 13. The amount of current flowing between source and drain terminals is then controlled by application of a gate voltage, which voltage serves to add to or subtract from the fields at the asp. The avalanche current is approximately linearly dependent upon the applied control voltage.

In the preferred form of the structures considered, the p-n junction is quite unsymmetrical and has much higher doping on the source side of the junction. This will, in general, result if the source region is formed by diffusion. The maximum field at the asp occurs near the p-n junction and the lack of symmetry makes the voltage drop between source and drain occur chiefly between the asp and the drain. Consequently, it suffices to have the gate electrode present only in the immediate neighborhood of where the junction reaches the surface in order to permit control of the field at the asp by voltages applied between gate and source.

Figure 6:
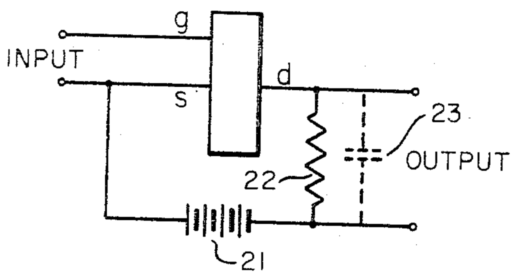
FIGURE 6 shows an amplifier circuit including a device in accordance with the invention.

Referring to FIGURE 6, there is shown a device in which an input signal "INPUT" is applied between source and gate electrodes to modulate the voltage of the asp 17 of the p-n junction, and thus the carrier density. A relatively high voltage 21 applies reverse voltage between the n-type source and p-type drain in series with a load circuit, resistance 22 in this example, across which is derived the amplified output signal, "OUTPUT." If desired, the load 22 may contain reactive components such as the capacitor 23 shown in dotted line to tune the load to the drain source capacitance and optimize the power gain.

Figure 3:
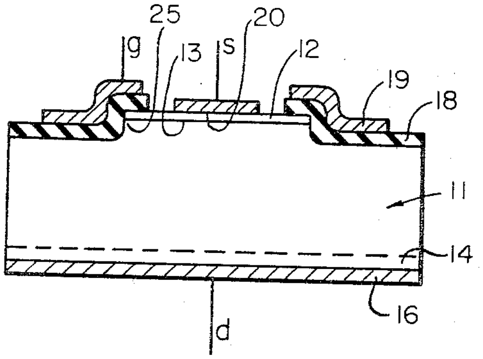
FIGURE 3 is a cross-sectional elevational view of a mesa structure incorporating the present invention.
Figure 2:
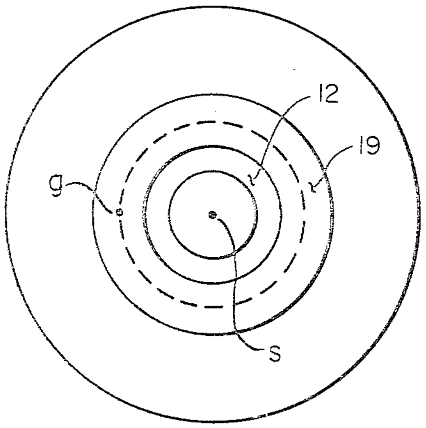
FIGURE 2 is a plan view of the device shown in FIGURE 1.

The device shown in FIGURE 3 operates similarly to the device shown in FIGURE 1 and includes like reference numbers to like parts. The device if of mesa configuration wherein the edge of the p-n junction 13 extends to the side 25 of the device. An insulating layer, such as oxide, overlies the portion 25. The gate electrode is carried over the junction on the oxide layer.

Figure 5:
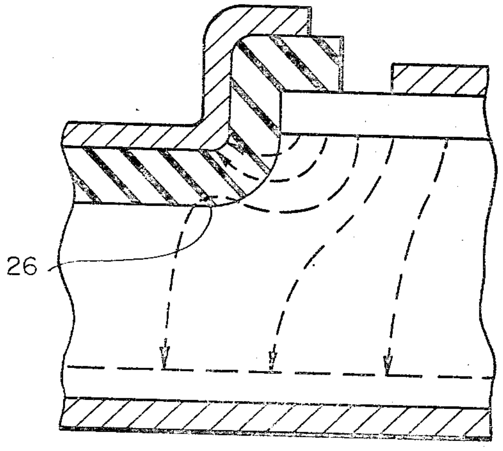
FIGURE 5 depicts schematically the electric field distribution in the device of FIGURE 3.
Figure 4:
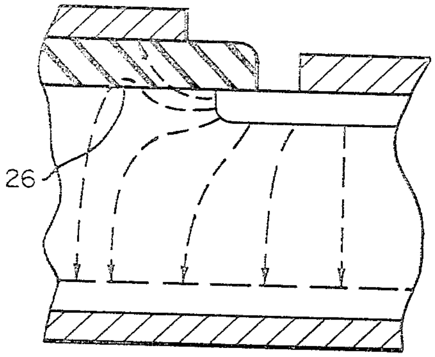
FIGURE 4 depicts schematically the electric field distribution in the device of FIGURE 1.

Referring to FIGURES 4 and 5, the electric field configuration within the device is shown for an n-type source and p-type drain to more clearly describe its operation. It is seen in these that in the area under the source electrode, the electric field comprises essentially parallel lines of force. However, in FIGURE 4, at the edge of the source diffusion, there is an electric field concentration. On the other hand, in FIGURE 5, there is a shielding action by the gate electrode. This shielding action tends to reduce the electric field at the edge of the source electrode when no gate voltage is applied.

Both FIGURES 4 and 5 illustrate the influence of applying negative gate voltages in respect to the source. This increases the electric field at the approximate edge of the source region. Since the spacing between gate and source is small compared to that between drain and source, substantially smaller voltages can produce large electric fields adjacent the gate electrode. Avalanche breakdown at the avalanche source point can easily be achieved.

The influence of the gate voltage on this field is very strong. This can be understood by considering the dielectric displacement that can be sustained by a good insulator such as silicon oxide or titanium dioxide compared to the dielectric displacement required in silicon to produce avalanche breakdown. Dielectric displacement is expressed in terms of coulombs/cm.$^2$ and can be represented by the formula KE where E is the electric field in volts/cm. and K is the dielectric constant which, for convenience, we express in farads/cm. The dielectric displacement through silicon oxide may be made several times greater than that necessary to produce avalanche fields in silicon. The value required in silicon is approximately $0.5\times10^{-6}$ coulombs/cm.$^2$ since the corresponding values for K and E under avalanche breakdown conditions are approximately $K=1.04\times10^{-12}$ farad/cm. and $E_B=0.5\times10^6$ volt/cm. For an insulator with a higher dielectric constant, such as titanium dioxide, lower electric fields and gate voltages are required for the same dielectric displacement.

If a voltage is applied to the gate so as to lower the breakdown voltage and the drain voltage is increased in the reverse direction, breakdown at avalanche source point will be reached. When this occurs, spontaneous generation of carriers will occur at the asp as soon as the first thermally generated carrier or otherwise accidentally produced carrier crosses this region. This generation will build up a space charge condition which reduces the electric field just to the breakdown voltage at which point avalanche discharge will be sustained.

For the cases represented in FIGURES 4 and 5, holes generated by this avalanche discharge will flow in the directions of the lines of force. They will not be able to cross into the silicon dioxide and consequently will tend to accumulate in a layer on the surface. This accumulation of charge will be one of the contributions which reduces field at the asp just to the breakdown value $E_B$. These carriers pressed against the insulating layer will find a tangential electric field produced both by the gate voltage and by the drain voltage and they will move laterally along the oxide until they reach the pull-off point marked 26 on FIGURES 4 and 5. At this point, the component of the electric field normal to the Si-$SiO_2$ interface reverses and carriers will flow to the drain.

It is evident for field configurations like those represented for structures of the proportions of FIGURES 4 and 5 that the tangential components of electric field will be substantially smaller than the electric fields at the asp. On the other hand, they will not be as much as ten times smaller; consequently, they will represent very high fields so far as ordinary semiconductor devices are concerned and carriers moving in these fields will continue to travel with drift velocities closely approaching those limited by collision processes. An estimate is that these velocities will approach a value $v_m=2\times10^7$ cm./sec.

It should be noted that for a structure like that of FIGURE 4 a mode of operation is possible in which the potential applied to the gate is such as to raise the breakdown voltage over what it would be with gate connected to source. Under these conditions, the electric field emerging from the avalanche control layer into the silicon is such as to push holes inward; consequently, carriers generated at the avalanche source point will not actually flow against the surface but will travel through the transport region directly from the avalanche source point to the drain without coming in contact with the oxide layer. For some modes of operation this has the advantage that any influence of surface states between the silicon oxide is reduced since change in charge due to variations in carrier density does not have an opportunity to influence these states.

Electrostatic considerations similar to those applicable to vacuum tubes apply to the structure of FIGURES 4 and 5. In particular, the ratio of electric fields at the asp can be characterized by a voltage amplification factor $\mu$. An advantage of the structure of FIGURES 3 and 5 is that the shielding action of the gate electrode tends to prevent the drain voltage from reaching the asp. Consequently, this structure can be made to have a relatively high $\mu$, values of 10 or more being quite possible.

An advantage of the surface controlled avalanche transistor structure for relatively high power applications is that it is free of the form of thermal instability which results in failure for power transistors. This thermal instability has been discussed in various publications. It arises from the positive temperature coefficient of current at constant voltage. As a result of this positive temperature coefficient, a local hot spot in a transistor dissipates more than its proper share of power and this can produce an unstable temperature rise which finally results in a concentration of current and destruction, or at least improper performance of the transistor. For the surface controlled avalanche transistor, the corresponding temperature coefficient is negative. This arises from the well known effects which cause the avalanche breakdown voltage to have a positive temperature coefficient so that at constant voltage with increasing temperature an avalanche region tends to turn itself off.

The theory of operation of the transistor can be understood in terms of the unit cube conductance $$Kv_m=2\times10^{-5} \text{ mho.}$$

This can be derived from the treatment of resistance due to space charge of secondary carriers. For structures like FIGURES 4 and 5, it is seen that the unit cube conductance is approximately the value of the transconductance per unit cube in the neighborhood of the asp. For this case, each cube should be taken to have an edge approximately equal to the effective thickness of the avalanche control layer. The effective thickness $a$ is defined in terms of the equivalent thickness for a silicon layer which would have the same capacitance per unit area. Since $SiO_2$ has a dielectric constant of 4 compared to vacuum while silicon has a value of approximately 12 compared to vacuum, the effective thickness $a$ is evidently the actual thickness divided by 3. The number of such cubes per unit length of the structure shown in FIGURES 4 and 5 is $1/a$; consequently, the transconductance is $Kv_m/a$. This conductance applies to the excess voltage above that necessary to reach the avalanche breakdown field $E_B$ at the asp provided that the drain voltage is high enough to collect the avalanche generated carriers. For voltages below that required to produce $E_B$, the current has the relatively negligible value associated with a reverse biased junction. This leads to $$I=(PKv_m/a)\ [V_g+(V_d/\mu)-V_o] \text{ or } 0$$

where $V_o$ is the voltage that must be exceeded by $$V_g+(V_d/\mu)$$

in order to reach $E_B$ at the asp. In this expression, I is the total carrier current flowing through the device and $V_g$ and $V_d$ are voltages in respect to the source applied in the breakdown direction for the junction. P is the perimeter of the structure in centimeters and $\mu$ is the voltage amplification factor derived by electrostatics for the relevant structure. When this analysis is combined with considerations for transit time effects, it is concluded that optimized structures can operate to frequencies comparable to the transit times for carriers through the structure.

Figure 7:
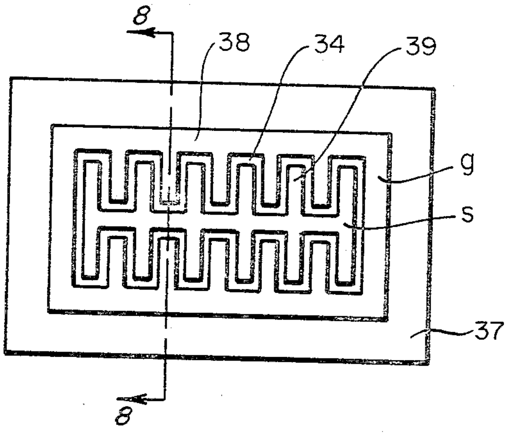
FIGURE 7 illustrates another transistor in accordance with the invention.
Figure 8:
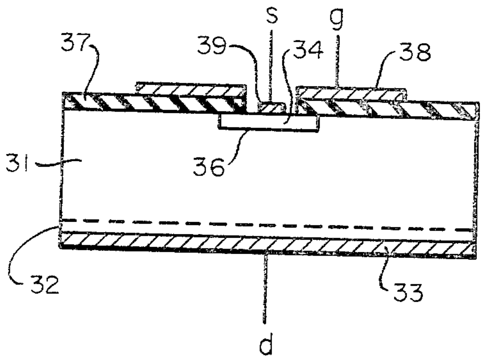
FIGURE 8 is a sectional view taken along the line 8—8 of FIGURE 7.

It is apparent that an interdigitated or convolute structure may also be employed. Referring to FIGURES 7 and 8, an intedigitated structure is shown. The structure includes a drain region 31 having a high impurity concentration drain contact portion 32 which receives the drain electrode 33. A rib-shaped source 34 is inset into the drain region to form a rectifying junction 36. An oxide layer 37 is formed in the upper surface. The gate electrode 38 is carried by the oxide layer adjacent the junction 36. Electrode 39 is provided for the same region. The interdigitated device is capable of handling higher power because of the larger periphery of the avalanche-breakdown source point.

Figure 9:
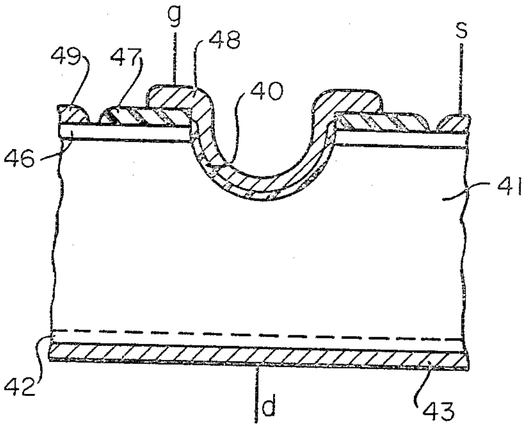
FIGURE 9 illustrates an interdigitated transistor employing a grooved structure.

The geometry of FIGURE 7 can be altered so that 39 becomes the gate electrode and 38 the source electrode. In this case, the gate regions may be in the form of grooves corresponding to the lowered edges of the mesa structure of FIGURE 3 or FIGURE 5. Such a groove structure is shown in FIGURE 9. An advantageous feature of this structure is the relative thinness of the oxide layer 40 between the gate electrode 48 and the asp compared to the much thicker layer 47 between gate electrode and the source region 46. This permits high $\mu$ values to be obtained without increasing source-gate capacitance as much as would occur if the oxide layer 47 were as thin as layer 40.

This structure can be produced by growing layer 40 by anodic oxidation as discussed below in connection with the mesa device. Another advantageous feature of the gate-groove structure of FIGURE 9 is that the grooves may be made narrow, thus reducing gate-drain capacitance. The gate electrode can be wider than the groove since it may overlap onto oxide layer 47. The advantages for improving high frequency performance of reducing gate capacitance to source and drain while maintaining small spacing to the asp, where the gate controls the current, are the same as the advantages of reducing grid-plate and grid-cathode capacitance in a vacuum tube while maintaining high transconductance.

Although processes for forming structures of the type shown are well known in the art, an example of a mesa and a planar device which were constructed is presented so that the teaching of the invention can be practiced without any analysis or experimentation.

The starting material used for the mesa device was a silicon n− epitaxial layer grown onto an n+ substrate. The n+ side of the slice served as the drain contact, and a p+ source was diffused into the n− side. The resistivity of the n− epitaxy was 9.2Ω cm., 20$\mu$ thick.

The starting material used for the planar device was 3Ω cm. p-type silicon. Gate and source ohmic contacts were made to both the mesa and planar devices by aluminizing and selective etching. The drain contact was formed by evaporation of gold.

The steps in the mesa device were as follows:

(1) Etch or clean upper n− surface.

(2) Predeposition of p+ region (boron 30 min. at 950° C.)

(3) Slice oxidized in ethyl silicate 1 hr. at 750° C. to produce thick oxide over source region.

(4) Apply a photoresist to ethyl silicate oxide surface to define mesa area and source contact area.

(5) Etch away unprotected $SiO_2$ to expose n+ source contact area and n+ mesa area.

(6) Remove photoresist.

(7) Mask mesa area with masking wax.

(8) Etch away unmasked n+ surface to form mesa.

(9) Clean slice and diffuse in dry oxygen 20 min. at 1100° C. to form thin thermal oxide over mesa edge.

(10) Evaporate aluminum over entire top surface of slice.

(11) Apply photoresist to define gate ring covering mesa edge.

(12) Etch unprotected aluminum away leaving gate ring covering mesa edge.

(13) Remove photoresist.

(14) Short etch to remove $SiO_2$ in source contact area which was grown in step #8.

(15) Evaporate aluminum dot through metal mask for source contact electrode.

(16) Evaporate gold on back side of device (drain) for ohmic contact.

The steps in the formation of a planar device were as follows:

(1) Etch or clean upper surface.

(2) Formation of oxide layer on upper surface, 1200° C. in steam.

(3) Formation of source diffusion window on oxide layer by photoresist masking and etching.

(4) Predeposition of n+ material.

(5) Steam oxidation for 5 min. at 1000° C. to convert phosphorus glass.

(6) Formation of source contact region in oxide layer formed during diffusion.

(7) Aluminize upper surface.

(8) Apply photoresist and etch unprotected aluminum to define source and gate contacts.

(9) Evaporate gold on back side of device (drain) for ohmic contact.

The procedure for making the mesa structure may be used to form the grooved-gate structure of FIGURE 9 with modification of the photoresist masks. The outer edge of the electrode area 46 may be made planar or may be provided with a high voltage breakdown guard ring to avoid surfact problems. As an alternative to forming the avalanche control layer by thermal oxidation, anodic oxidation may be employed.

Other processes may be followed. The starting wafer determines the characteristics of the step junction and the subsequent formation of the step junction is not critical. The thickness of the oxide layer which carries the gate electrode determines to some degree the control exerted by the gate electrode.

Although the examples presented are based on an n+ source and a p+ drain contact region, it is evident that the principles apply to the reverse polarity of a p+ source and n+ region for the drain contact. It is also evident that the chemical charge density in the transport region between the heavily doped source and drain contact region may be intrinsic. In this case the asp is not defined by the p-n junction but instead by the location at which the breakdown field first occurs as $V_g$ and $V_d$ are increased. This conclusion will still apply even if the central or transport region is doped in the same polarity as the source so that the junction occurs near the drain contact region.

Thus, there is described a device in which the generation of avalanche carriers is controlled by a control electrode. The carriers then fall through the principal voltage drop of the device. A high power, high frequency stable semiconductor device results.

I claim:

1. Semiconductor apparatus, comprising:

a semiconductor body having first and second adjacent regions of given and opposite respective conductivity types with a P-N junction therebetween extending to a given surface of said body, the portion of said junction extending to said surface having a reverse bias breakdown voltage such that application of said voltage to said junction portion produces an electric field of high intensity normal to said junction portion, said field causing generation of avalanche carriers, said carriers flowing across said junction portion under the influence of said field to produce an avalanche current;

a source electrode on said given surface contiguous with said first region;

a drain electrode opposite said source electrode contiguous with said second region;

means including said source and drain electrodes for applying said voltage to said junction portion; and means for controlling said avalanche current by varying said high intensity electric field at said junction portion including a layer of insulating material on said given surface and a control electrode disposed on said insulating layer adjacent said junction portion, said control electrode being relatively close to said junction portion and relatively remote from said drain electrode such that said control electrode serves to shield said junction portion from the full effect of electric fields due to any potentials applied to said drain electrode.

2. Semiconductor apparatus according to claim 1, wherein said given surface includes a groove adjacent said junction portion.

3. Semiconductor apparatus according to claim 1, wherein the resistivity of the part of said first region adjacent said junction portion is substantially lower than the resistivity of the part of said second region adjacent said junction portion.

4. Semiconductor apparatus according to claim 1, wherein a part of said second region forms a mesa such that said P-N junction extends to the side of said mesa.

5. Semiconductor apparatus according to claim 2, further comprising an insulating film contiguous with said insulating layer and overlying a part of said first region adjacent said junction portion, said control electrode comprising a metallic layer overlying said insulating layer and insulating film, said insulating film having a thickness substantially greater than the thickness of said insulating layer thereby to reduce the capacitance between said control electrode and said first region.

References Cited

UNITED STATES PATENTS

| | | | |
|---|---|---|---|
| 3,045,129 | 7/1962 | Atalla | 307—88.5 |
| 3,202,840 | 8/1965 | Ames | 307—88.5 |
| 3,204,160 | 8/1965 | Sah | 317—235 |
| 3,233,123 | 2/1966 | Heiman | 307—88.5 |

OTHER REFERENCES

J. H. Forster and H. S. Veloric, Journal of Applied Physics, vol. 30, No. 6, June 1959 (pp. 906–912).

JOHN W. HUCKERT, *Primary Examiner.*

M. EDLOW, *Assistant Examiner.*